United States Patent
Chu et al.

(10) Patent No.: US 11,216,148 B1
(45) Date of Patent: Jan. 4, 2022

(54) SYSTEMS AND METHODS FOR RESPONSIVE CONTAINER VISUALIZATIONS

(71) Applicant: MicroStrategy Incorporated, Tysons Corner, VA (US)

(72) Inventors: Keng-Fu Chu, Fairfax, VA (US); Amy Dina Laresch, Washington, DC (US); Yung-Sheng Chen, Bethesda, MD (US); Rujun Dai, Fairfax, VA (US); Zhili Cheng, Dunn Loring, VA (US); Alejandro Olvera Velasco, Falls Church, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 0 days.

(21) Appl. No.: 17/370,055

(22) Filed: Jul. 8, 2021

(51) Int. Cl.
*G06F 3/00* (2006.01)
*G06F 3/0481* (2013.01)
*G06F 3/0488* (2013.01)
*G09G 5/00* (2006.01)
*G06F 3/0484* (2013.01)
*G06F 3/01* (2006.01)

(52) U.S. Cl.
CPC .......... *G06F 3/0481* (2013.01); *G06F 3/0484* (2013.01); *G06F 3/04886* (2013.01); *G09G 5/003* (2013.01); *G09G 2340/0407* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 2003/0229845 A1* | 12/2003 | Salesin | ............... | G06F 16/9577 715/249 |
| 2005/0102628 A1* | 5/2005 | Salesin | ................ | G06F 40/106 715/764 |
| 2007/0288840 A1* | 12/2007 | Girle | ..................... | G06F 40/221 715/234 |
| 2008/0168349 A1* | 7/2008 | Lamiraux | ........... | G06F 3/04883 715/702 |
| 2009/0013250 A1* | 1/2009 | Hsieh | .................... | G06F 40/106 715/273 |

(Continued)

*Primary Examiner* — Toan H Vu
(74) *Attorney, Agent, or Firm* — Bookoff McAndrews, PLLC

(57) ABSTRACT

Disclosed are methods, systems, and computer-readable medium for dynamically displaying database containers. A display packet including a first container and a second container may be received for display via a document. A display indication including a first display requirement for the first container and a second display requirement for the second container may be received. A display size of the document may be determined. A display status may be determined based on the display size, the display status corresponding to one of being greater than a breakpoint or being less than or equal to the breakpoint. The first container and the second container may be provided to the document. A determination may be made, based on the display status and the display indication, to hide the first container and display the second container. The second container may be displayed via the document while hiding the first container.

20 Claims, 8 Drawing Sheets

(56) References Cited

U.S. PATENT DOCUMENTS

| | | | |
|---|---|---|---|
| 2009/0241048 A1* | 9/2009 | Augustine | G06Q 10/10 715/769 |
| 2011/0044170 A1* | 2/2011 | Kure | H04L 47/621 370/235 |
| 2011/0225159 A1* | 9/2011 | Murray | G06F 16/358 707/739 |
| 2014/0006936 A1* | 1/2014 | Shekey | G09G 5/14 715/252 |
| 2014/0359431 A1* | 12/2014 | Tummalapenta | G06F 40/151 715/249 |
| 2015/0106697 A1* | 4/2015 | Zhang | G06F 40/131 715/243 |
| 2015/0254732 A1* | 9/2015 | Snyder | G06Q 30/0277 705/14.72 |
| 2020/0034940 A1* | 1/2020 | Parikh | G06Q 50/163 |

* cited by examiner

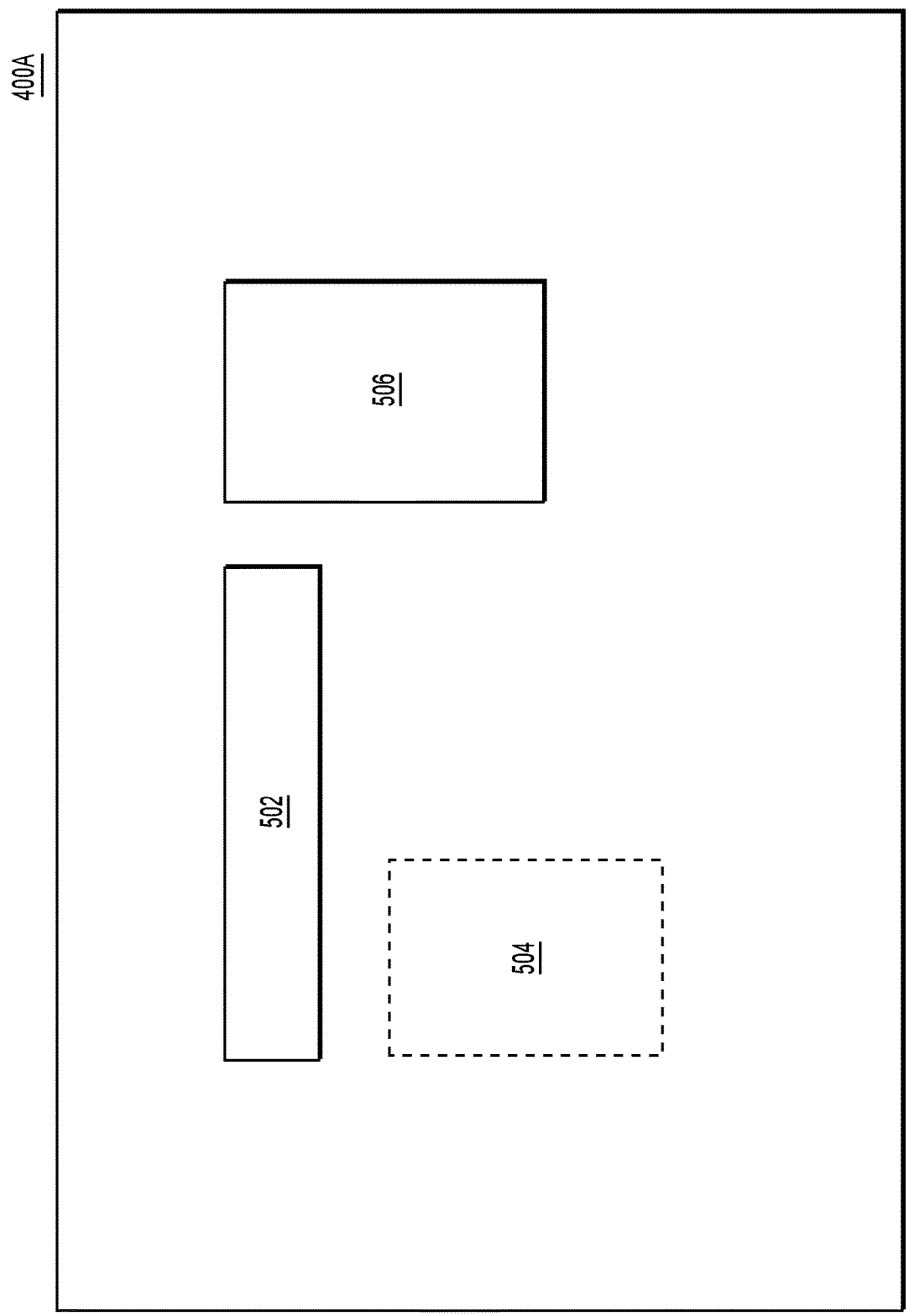

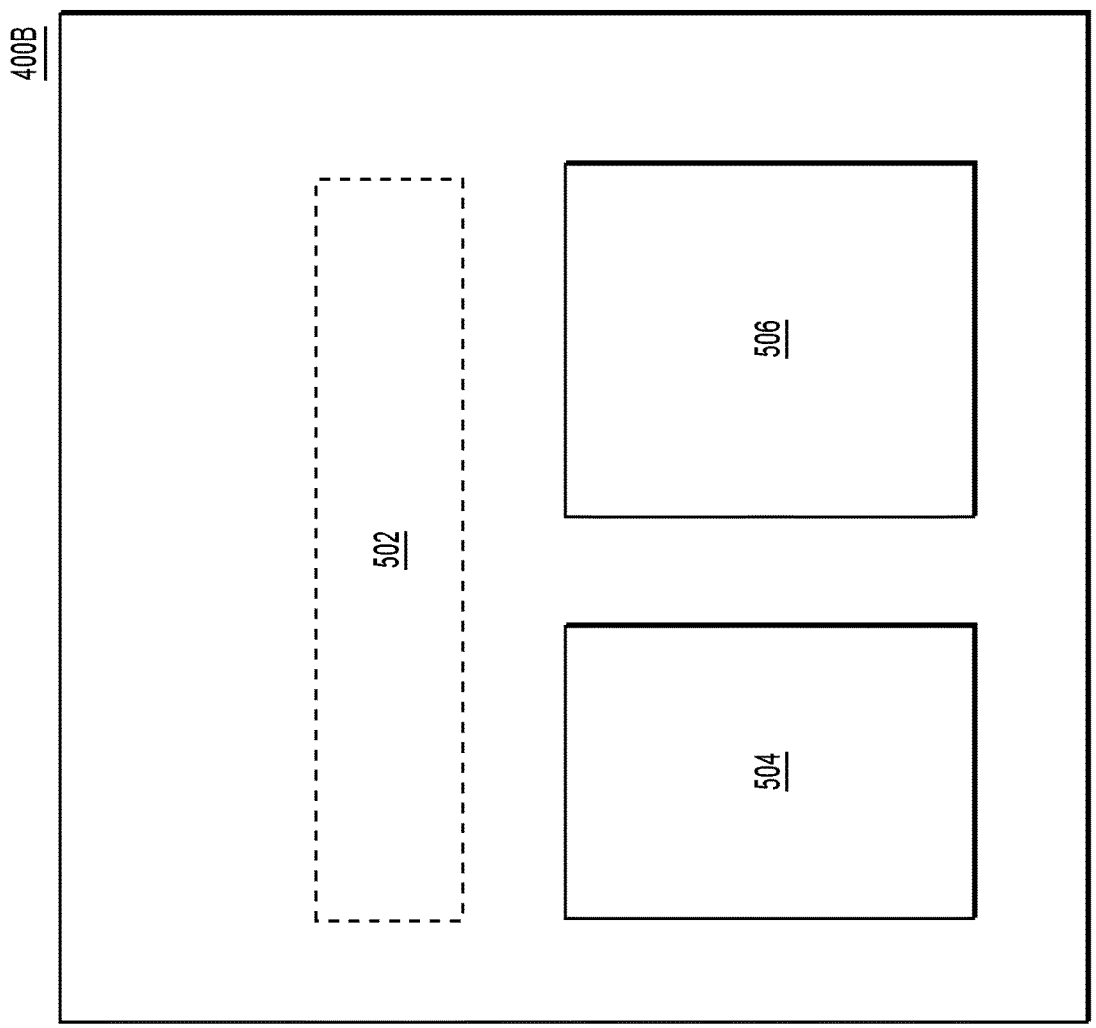

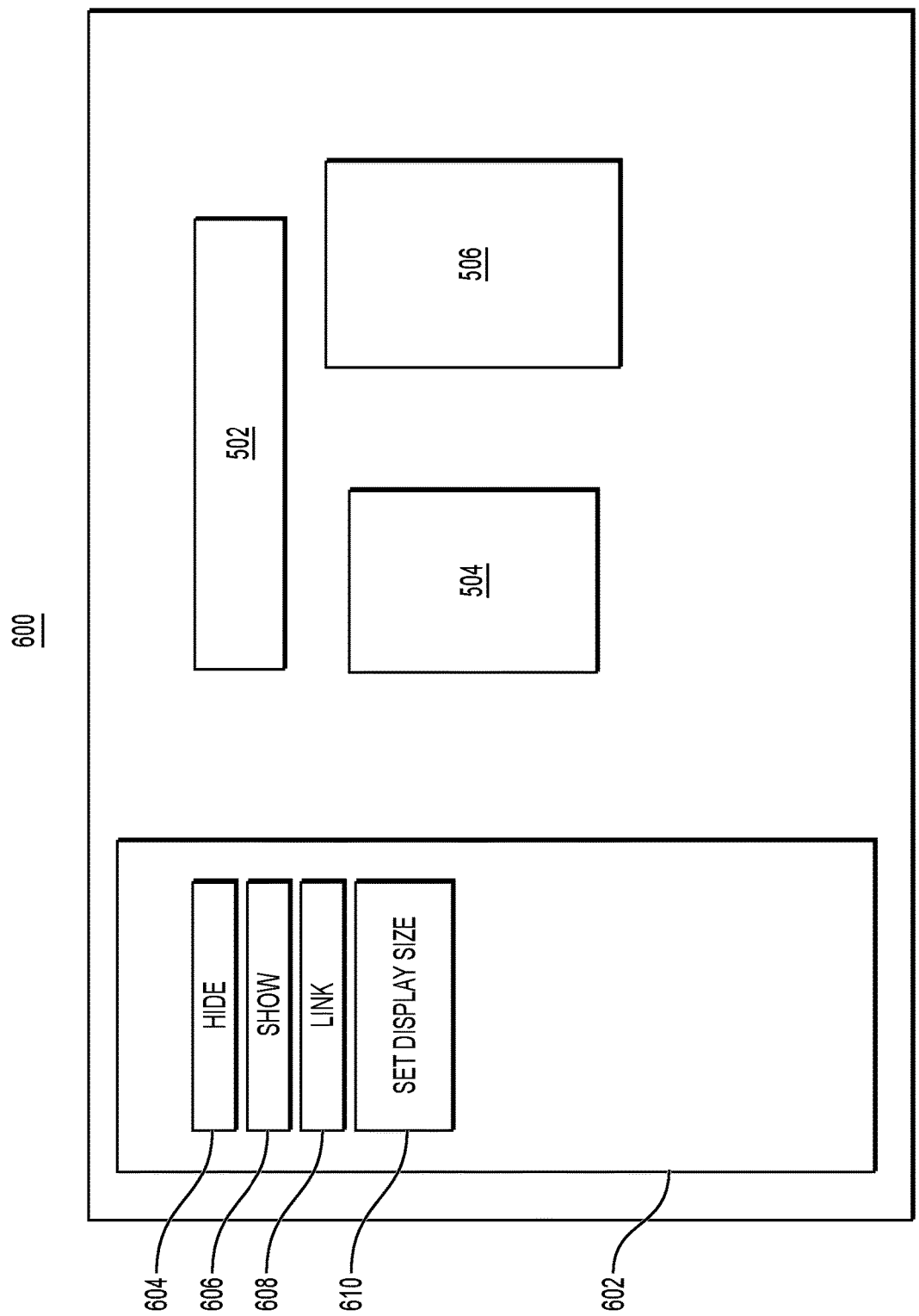

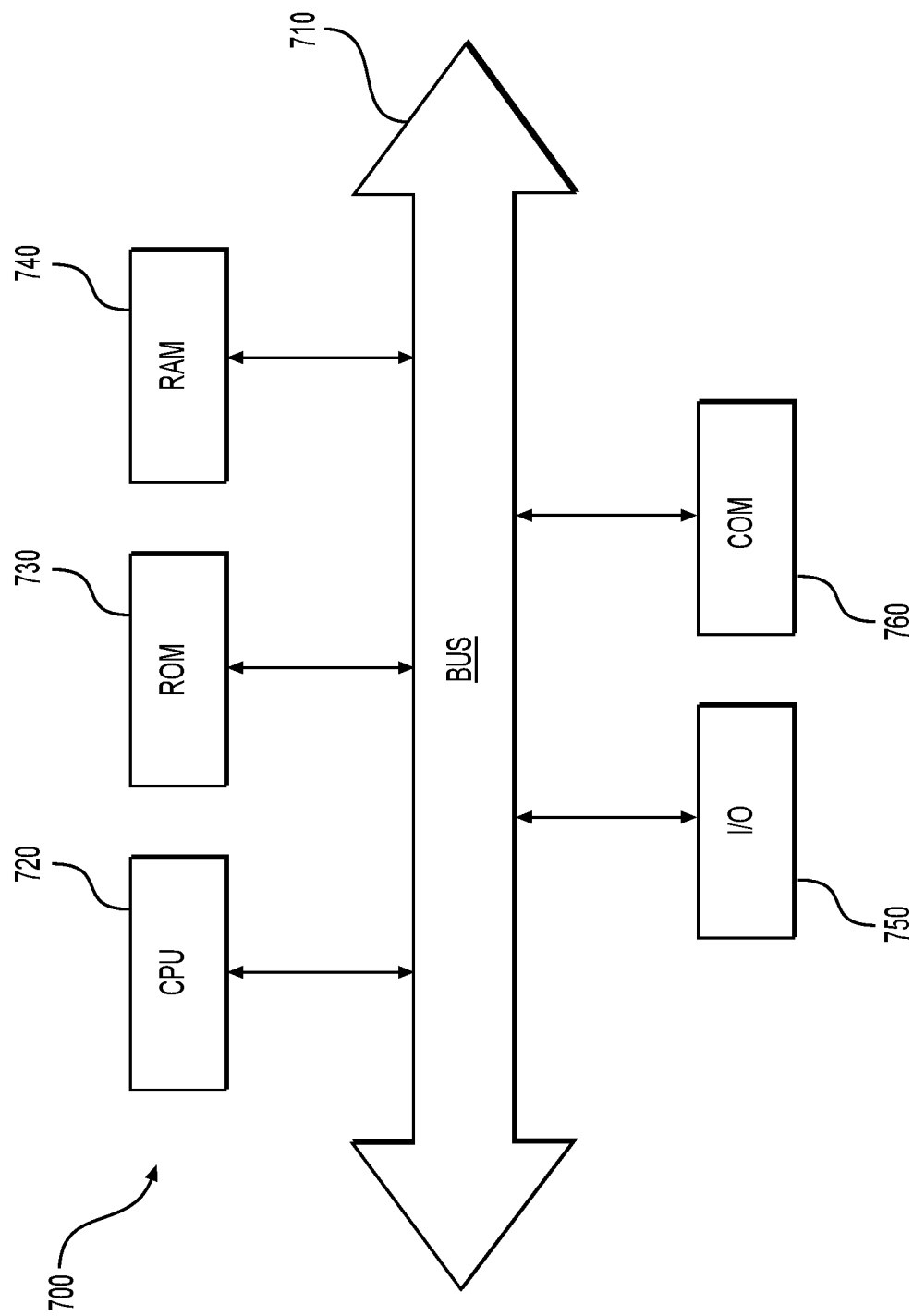

SYSTEMS AND METHODS FOR RESPONSIVE CONTAINER VISUALIZATIONS

TECHNICAL FIELD

Various embodiments of the present disclosure relate generally to methods and systems for dynamic container visualization and, more particularly, to methods and systems for modifying the display of containers based on screen breakpoints.

BACKGROUND

There is increased variability in display sizes for documents such as, e.g., software applications. Users can use multiple devices with varying screen sizes, can resize screens on a single device, and/or one or more software programs can modify screen sizes (e.g., based on user preference, displayed content, etc.). It is cumbersome and inefficient to program different interfaces for different screen sizes. For example, a developer may program a first interface for a desktop application and a second interface for a mobile application. Additionally, such programming may not be conducive to a screen size that is not previously contemplated by the developer (e.g., a newly dimensioned mobile device).

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for dynamically displaying containers. For instance, a method may include: receiving a display packet comprising a first container and a second container for display via a document; receiving a display indication comprising a first display requirement for the first container and a second display requirement for the second container; determining a display size of the document; determining a display status based on the display size, the display status corresponding to one of being greater than a breakpoint or being less than or equal to the breakpoint; providing the first container and the second container to the document; determining, based on the display status and the display indication, to hide the first container and display the second container; and displaying the second container while hiding the first container, at a first time, via the document.

Furthermore, a system may include at least one memory storing instructions; and at least one processor executing the instructions to perform operations. The operations may include: receiving a display packet comprising a first container and a second container for display via a document; receiving a display indication comprising a first display requirement for the first container and a second display requirement for the second container; determining a display size of the document; determining a display status based on the display size, the display status corresponding to one of being greater than a breakpoint or being less than or equal to the breakpoint; providing the first container and the second container to the document; determining, based on the display status and the display indication, to hide the first container and display the second container; and displaying the second container while hiding the first container, at a first time, via the document.

Moreover, a non-transitory computer-readable medium may store instructions that, when executed by a processor, cause the processor to perform operations. The operations may include: receiving a display packet comprising a first container and a second container for display via a document; receiving a display indication comprising a first display requirement for the first container and a second display requirement for the second container; determining a display size of the document; determining a display status based on the display size, the display status corresponding to one of being greater than a breakpoint or being less than or equal to the breakpoint; providing the first container and the second container to the document; determining, based on the display status and the display indication, to hide the first container and display the second container; and displaying the second container while hiding the first container, at a first time, via the document.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5A depicts a diagram for a display size bigger than a break point, according to one or more embodiments.

FIG. 5B depicts a diagram for a display size smaller than a break point, according to one or more embodiments.

FIG. 6 depicts a diagram of an author portal, according to one or more embodiments.

FIG. 7 depicts an example system that may execute techniques presented herein.

DETAILED DESCRIPTION OF EMBODIMENTS

Figure 1:
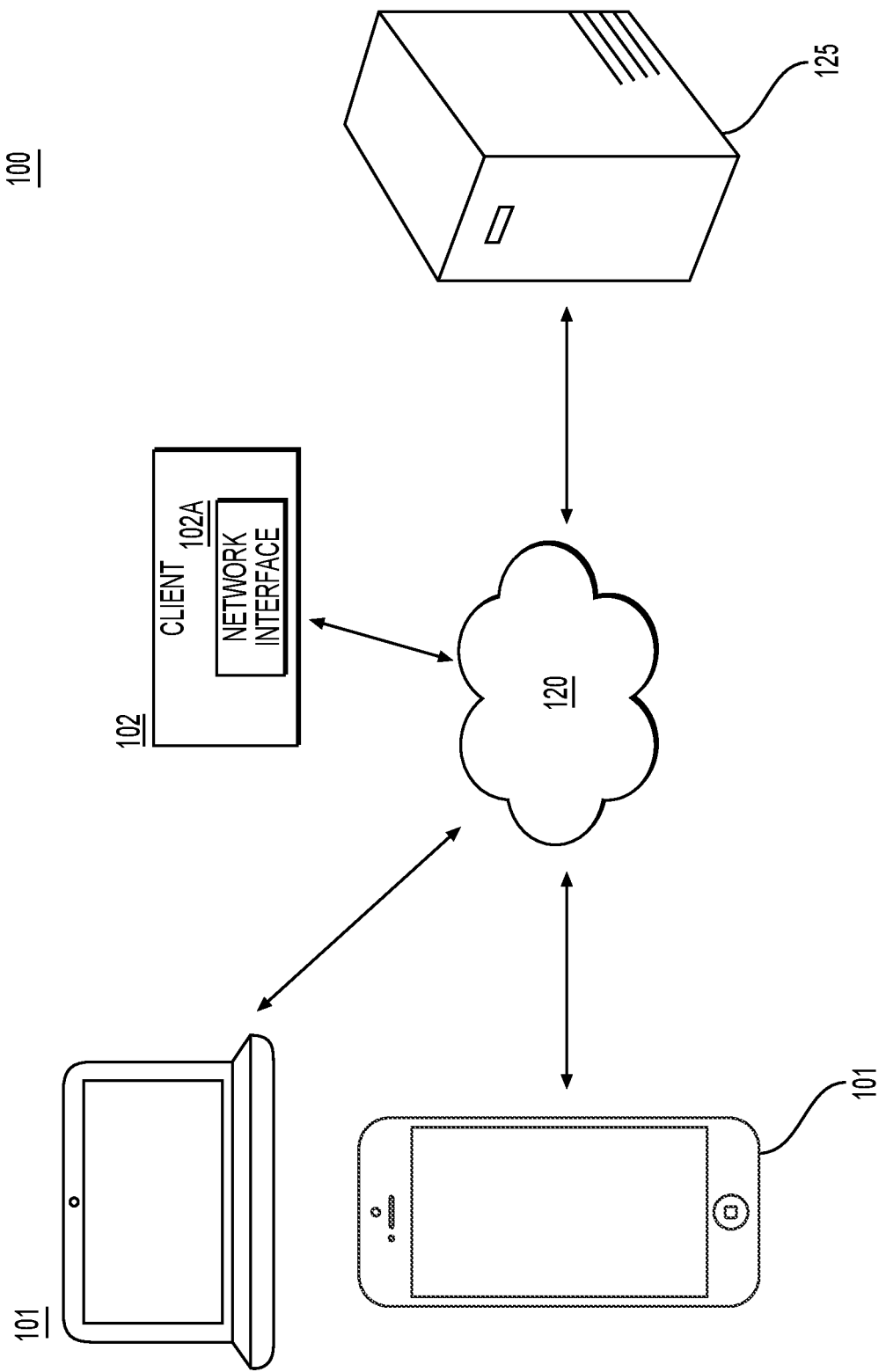
FIG. 1 depicts an exemplary block diagram of a system, according to one or more embodiments.

Various embodiments of the present disclosure relate generally to methods and systems for dynamic component visualization.

In general, the present disclosure is directed to improving display technology by dynamically displaying components based on screen properties (e.g., display size). The techniques disclosed herein reduce the number of iterations of a given document (e.g., a software application) needed by, e.g., removing the need for multiple iterations for different screen properties (e.g., different screen sizes). The techniques disclosed herein also reduce network transmission requirements by minimizing the iterations of content (e.g., images) retrieved for a given document. For example, instead of having multiple different image resolutions of the same image stored in a database, such that different sized interfaces pull different image resolutions, a single pull may be sufficient. The single pull may obtain the different image resolutions as only an applicable image resolution is displayed while the others are hidden. This configuration requires less instances of network access and pulls, thereby reducing the multiple network touches and associated inefficiencies.

Embodiments of the disclosed subject matter are directed to adjust providing (e.g., displaying or hiding) one or more containers (e.g., content, images, etc.) based on a display size (e.g., number of pixels) of a given document (e.g., a dossiers, dashboard, software application, etc.).

As applied herein, a container may be any stand-alone or in-line item of content such as an image, a graphic, a video, a banner, a text, a visualization, an overlay, or the like, that can be displayed via a document. The container may be provided to a document from a memory or storage (e.g., a database) and/or may be fully or partially generated at the document. For example, a container may be generated based on code from a document compiler which calls for an image to be pulled from a database. The example container may be generated based on compiling the code and retrieving the image from the database. A container may be static or dynamic. A dynamic container may be updated based on a passing of time (e.g., a pre-determined amount of time) or a trigger condition (e.g., an event, update, etc.). The update may include retrieving updated content from a memory or database.

As applied herein, a display packet may be a grouping of containers for display via a document. The display packet may be stored in a given location (e.g., remote or local memory or database) and components (e.g., containers) of the display packet may be stored in different locations. The display packet may include all or a portion of the content that is displayed by a document at a given time. The display packet may also include relationships between two or more containers, as further disclosed herein. The relationships and/or metadata or other data associated with the containers included in a display packet may also be stored in the display packet or be associated with the display packet (e.g., via a separate file, via a header, etc.).

As applied herein, a display indication may include display requirements for one or more containers and may be provided as code from an author portal, as further disclosed herein. The display indication may be based on a display property. For example, a display indication may be an instruction to hide or display a container based on a display size of a document. The display instruction may be generated at an author portal and may be modified by an author. The display indication may be provided as a code, as a logic implementation, or the like. For example, the display indication may be generated using a graphical user interface (GUI) or as a code (e.g., compliable code).

As applied herein, a document may be any dossier, dashboard, interface, display, output, or the like that can provide components (e.g., content) to a user. A document may be a webpage, an application (e.g., a software application, a mobile application, a proprietary application, etc.), a projection, a software or software implementation, a browser, or the like. The document may receive containers from one or more databases and may also receive or may be configured based on one or more display indications. The document display size of a document may be, at least in part, modifiable by a user (e.g., a resize, a snap to size, etc.). Alternatively, or in addition, the document display size may be determined based on a device (e.g., a screen size) or software application.

As applied herein, a display status may be a determination of a display size relative to a threshold. The threshold may be a breakpoint, as further discussed herein, or another threshold. The display status may be determined periodically, upon initialization of a document, or upon a change in the size of a document. The display size may be measured as one or more of a pixel size, a resolution, a width, a height, another dimension, or the like.

As applied herein, a breakpoint may be a given display size that can be used to program a display indication. For example, the breakpoint may be 768 pixels as determined by an author. Accordingly, a display indication that triggers the display of a first container when the display size of a document is greater than the breakpoint may trigger the display of the first container when the corresponding document is greater than 768 pixels. A breakpoint may be provided by a user (e.g., an author, a document user, etc.), may be determined based on a given document, may be determined based on the one or more containers, may be determined by a machine learning model, or the like. A breakpoint may be modified (e.g., by an author). Alternatively, or in addition, a breakpoint may be output by a machine learning model (e.g., based on previous breakpoints, user interactions with documents and/or components, or the like).

The embodiments disclosed herein provide performance improvement by decreasing the amount of network pulls, resources, and time required when generating components for display via a document. By providing dynamic containers that can be hidden or displayed, less iterations of a given document (e.g., with static containers) need to be generated. For example, the same document can be displayed on a mobile device and a desktop computer as the document's components can adjust based on display properties, as disclosed herein. Accordingly, a database or memory may not need to store both a mobile device iteration and a desktop iteration of the document. Additionally, as the containers for a given document may be hidden, multiple components can be obtained at one time instead of pulling new containers via a network connection or cache. Accordingly, techniques disclosed herein mitigate the need to access a network, which leads to more reliable document use.

FIG. 1 depicts an exemplary network environment 100 in which systems, methods and other aspects of the present disclosure may be implemented. Environment 100 may include one or more user device(s) 101 under the operation of one or a plurality of users, a network 120, and at least one server 125. As shown, a user device 101 may be a laptop, a mobile phone, and/or may be any other applicable device such as a desktop, a hand held device, a wearable device, a projector, or the like. Server 125 may act as a repository for information discoverable by the user of the user device 101. Server 125 may be a single server or may include multiple servers, databases, etc. Server 125 may provide one or more containers to documents displayed via user device 101 and/or may provide content to populate containers. Server 125 may communicate with user device 101 via a network 120. Network 120 may be any suitable network or combination of networks and may support any appropriate protocol suitable for communication of data between various components in environment 100. Network 120 may include a public network (e.g., the Internet), a private network (e.g., a network within an organization), or a combination of public and/or private networks. Server 125 may be implemented using multiple computers that cooperate to perform the functions discussed below, which may be located remotely from each other. Server 125 may be a local server, a remote server, a cloud server, or the like. User device 101 may be operated by one or more users to access one or more documents.

A client 102 may be in communication with the user device and/or the server 125 via network 120. Network 120 may communicate with client 102 via a network interface 102A at client 102. An author portal, as disclosed herein, may be provided at client 102 such that one or more display indications are provided from client 102 (e.g., via input from a user) to a document at user device 101 or processor of user device 101.

Environment 100 may include one or more computer systems configured to gather, process, transmit, and/or receive data. In general, whenever environment 100 or components thereof is described as performing an operation of gathering, processing, transmitting, or receiving data, it is understood that such operation may be performed by a computer system thereof.

Figure 2:
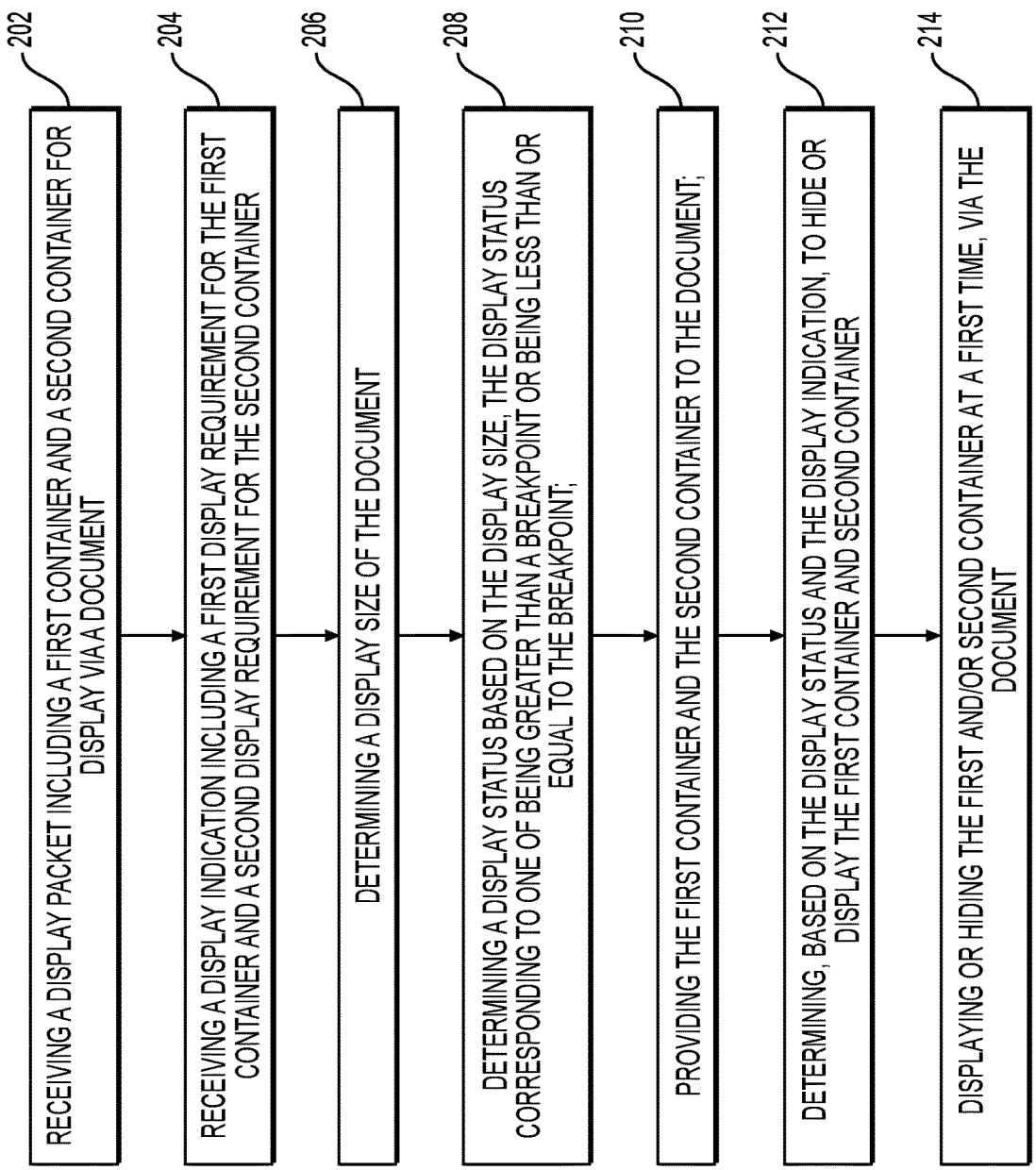
FIG. 2 depicts a flowchart for responsive container visualization, according to one or more embodiments.

FIG. 2 depicts a flowchart 200 for displaying containers via a document. At 202 of flowchart 200, a display packet including at least a first container and a second container may be received. The display packet may be received at user device 101 or at a server configured to populate a document at the user device 101. For example, the display packet may be received at user device 101 and may be stored in a local storage (e.g., memory, cache, etc.) for use to populate a document. Alternatively, for example, the display packet may be received at a web server that provides the content to be displayed via a document on the user device.

The display packet may be received based on a trigger. The trigger may be, for example, a document initiation, a user action, a preconfigured action, or the like. For example, a user may activate a software application on user device 101 and, based on the user activating the software application, the display packet may be retrieved from memory, cache, or from a database (e.g., server 125 via network 120). The display packet may receive the first container and/or the second container from memory, cache, or a database. Alternatively, or in addition, client 102 may provide all or a portion of the first container and/or the second container to be provided as a group via the display packet.

At 204 of FIG. 2, a display indication may be received. The display indication may include a first display requirement for the first container and may include a second display requirement for the second container. The display indication may be provided by client 102 and may be updated from time to time. A display requirement may include an instruction or algorithm that identifies how and/or when a respective container is displayed. The client 102 may generate the display indication using an author portal, as further discussed herein.

As an example, a display indication may include a first display requirement that defines when the first container should be hidden and/or when the first container should be displayed via a corresponding document. The display requirement may be based on a breakpoint. The breakpoint may be a threshold based on a display property. For example, the breakpoint may be a pixel size (e.g., 768 pixels) and the first display requirement for a first container may be based on the given pixel size such that the first container may be hidden or displayed if the document is above the given pixel size and may be hidden or displayed if the document is below the given pixel size. Similarly, according to this example, the second display requirement for the second container may be based on the given pixel size such that the second container may be hidden or displayed if the document is above the given pixel size and may be hidden or displayed if the document is below the given pixel size.

At 206 of FIG. 2, a display size of a given document may be determined. According to an implementation, the display size of the document may be determined based on the display size of the screen that the document is used on. Alternatively, or additionally, the display size of the of the document may be based on the portion of a display area (e.g., a screen, projection, etc.) that a document occupies. Alternatively, or additionally, the display size of the document may be based on an amount of space that a document covers in relation to the amount of space one or more other documents cover on a display.

The display size of a given document may be provided by user device 101 or may be provided by a software executed on user device 101. Alternatively, or in addition, the display size of a document may be provided by the document itself or a program associated with the document.

The display size of a document may change based on the orientation of user device 101 (e.g., landscape, portrait, etc.). Alternatively, the display size of a document may change based on a user action (e.g., a resize of a document screen, initiating or prioritizing another application, etc.). As disclosed herein, containers may be displayed based on a display size at a first time and an updated display size at a second time.

The display size of a document may be determined in any applicable manner. For example, the display size may be determined in pixels, widths, heights, another dimension, or the like. The display size may be determined based on the breakpoint provided in display indication. For example, if a display indication includes a requirement based on a pixel breakpoint, then the display size may be determined based on pixel sizes. As another example, if a display indication includes a requirement based on a width breakpoint, then the display size may be determined based on the width of a document.

At 208 of FIG. 2, a display status may be determined based on a display size. The display status may be based on the breakpoint of one or more requirements in a display indication. As an example, the display status may be that a given document's display size is greater than a breakpoint or is less than or equal to a breakpoint. Although binary display statuses are disclosed herein (e.g., greater than or less than/equal to), it will be understood that display statuses may not be binary. As an example, a display indication may include two or more breakpoints and a display status may be selected from three or more statuses based on the two or more breakpoints. According to this example, one or more containers may be displayed based on their multi-breakpoint based display status.

The display status determined at 208 may be stored as a numerical value (e.g., 1 or 0), a coded value, or the like. The display status may be provided to a compiler that complies code to render the document such that the complier may render the document based on the display status, as further discussed herein.

At 210 of FIG. 2, each of the plurality of containers in a display packet (e.g., at least a first container and a second container of 202) may be provided to the document. The plurality of containers may be provided to the document such that they are accessible for display via the document (e.g., immediately accessible). The plurality of containers may be provided to the document such that the document may not need to access a memory or database to display the containers but, rather, may have the plurality of containers accessible for display (e.g., after a code compile). Stated differently, the plurality of containers may be provided to the document such that the document may output the plurality of containers but may hide one or more containers from being visually seen by a user based on a transparency or other blocking setting, as further disclosed herein.

The plurality of containers in a display packet may be provided to the document simultaneously or may be provided at different times. For example, a first container may be provided from a first database at a first time and a second container may be provided from a second database at a second time. The plurality of containers provided to a document may include one or more of text, images, graphics, visualizations, videos, information, etc.

At 212 of FIG. 2, based on the display status and the display indication, display properties of the plurality of containers provided to the documents may be determined. The display property may include whether to hide or display a given container. Although a binary versus hidden properties are provided herein for simplicity, it will be understood that additional display properties may be implemented and may include, though are not limited to transparency, opacity, fading, color adjustment, size adjustment, or the like. At 212, both the display status and the display indication for a given container (e.g., a first display requirement for a first container) may be applied to determine a display property for the given container.

As an example, at 212, the display status may be that the document's display size is greater than a given breaking point. Accordingly, if a display requirement for a first container provides that the first container should be displayed when the display size is greater than the given breakpoint, the first container may be displayed. Similarly, if a display requirement for a second container provides that the second container should be displayed when the display size is greater than the given breakpoint, the second container may be displayed. Alternatively, if a display requirement for the first container provides that the first container should be hidden when the display size is greater than the given breakpoint, the first container may not be displayed. Similarly, if the display requirement for the second container provides that the second container should be hidden when the display size is greater than the given breakpoint, the second container may be hidden.

As another example, at 212, the display status may be that the document's display size is less than a given breaking point. Accordingly, if a display requirement for a first container provides that the first container should be displayed when the display size is less than the given breakpoint, the first container may be displayed. Similarly, if a display requirement for a second container provides that the second container should be displayed when the display size is less than the given breakpoint, the first container may be displayed. Alternatively, if a display requirement for the first container provides that the first container should be hidden when the display size is less than the given breakpoint, the first container may be not be displayed. Similarly, if the display requirement for the second container provides that the second container should be hidden when the display size is less than the given breakpoint, the second container may be hidden.

According to implementations of the disclosed subject matter, hiding a container may include maintaining data associated with the container at a given document, without displaying the data. For example, data (e.g., content, images, videos, graphics, visualizations, text, information, etc.) associated with a first container may be provided to a document. If, at 214 of FIG. 2, that first container is hidden based on a display indication and display size, the data associated with the container may still be maintained at the document such that it is output via the document. However, that data may not be visible to a user. For example, the transparency associated with the data may be set to 100% such that it is fully transparent to a user. Alternatively, the data may be provided via the document but may not be output to the user.

According to an implementation of the disclosed subject matter, maintaining data associated with a container at a document may include calling the data associated with the container at a runtime generation of the code associated with the document. At the runtime execution, code associated with the document may call the data associated with given container (e.g., from a local memory or one or more databases) and the data may be received at the document. At 214 of FIG. 2, the received data may be hidden such that it may not be displayed to a user viewing the document.

Although examples provided herein include a first container and a second container and/or display properties thereof, it will be understood that these examples in no way limit a given display property or other attribute to a given container and a "first container" and a "second container" are placeholder examples only.

At 214, the document may provide the plurality of containers received at 210 based on the determination at 212. For example, the first and/or second container may be hidden or displayed based on the determination at 212.

According to an example, according to the flowchart 200, a display packet including a first container and a second container may be received at 202, for display via a software application. A display indication including a first display requirement for the first container and a second display requirement for the second container may be received at 204. The first display requirement may state that the first container should be hidden when the display size of the software application is greater than a given breakpoint an should be displayed when the display size of the software application is less than the given breakpoint. The second display requirement may state that the second container should be displayed when the display size of the software application is greater than the given breakpoint an should be hidden when the display size of the software application is less than the given breakpoint. The display size of the software application operating on user device 101 may be determined at 206. At 208, a determination may be made that the display status of the software application is greater than a breaking point provided by client 102. At 210, both the first container and the second container may be provided to the software application. At 212, a determination may be made that, based on the display status (i.e., that the display size is greater than a breaking point) and based on the first display requirement, to hide the first container. Additionally, a determination may be made that, based on the display status (i.e., that the display size is greater than a breaking point) and based on the second display requirement, to display the second container. Accordingly, at 214, the second container may be displayed while the first container is hidden.

According to implementations of the disclosed subject matter, one or more containers may be associated with each other via a relationship. The relationship may be provided via a display indication provided at 204 of FIG. 2. The relationship may define how a first container is to be displayed based on how a second container may be displayed. For example, the relationship may define that when a second container is displayed, that a first container is also displayed. As another example, the relationship may define that when a first container is displayed, a third container should be displayed having a given dimension and that when a second container is displayed and the first container is hidden, the third container should be displayed having a different dimension.

In addition to the display size and display based display of containers, the relationships disclosed herein may allow for further dynamic display of containers. For example, a first container may be displayed when the display size is below a breakpoint (e.g., a small display size) and a second container may be displayed when the display size is above a breakpoint (e.g., a large display size). A third container may have a relationship indicated in the display indication that positions and/or resizes the third container for display based on whether the first container is displayed or whether the second container is displayed. Accordingly, by applying the display indication, based on the display size, to the first container and the second container, the display configuration of a third container may be adjusted.

According to an implementation, a relationship between containers may be output by a machine learning model. The relationship between one or more containers may be output by a machine learning model that is trained based on previous container configurations and/or user interactions with containers via one or more documents. As an example, a machine learning model may be trained based on past container configurations and based on user interactions with the past containers. The machine learning model may determine that user interaction is high between a first container and a third container as well as a second container and the third container. Accordingly, the machine learning model may output a relationship that associates the first container and the third container and/or the second container and the third container. Based on the output relationship, a document may display a third container proximate to the first and/or second containers.

Figure 3:
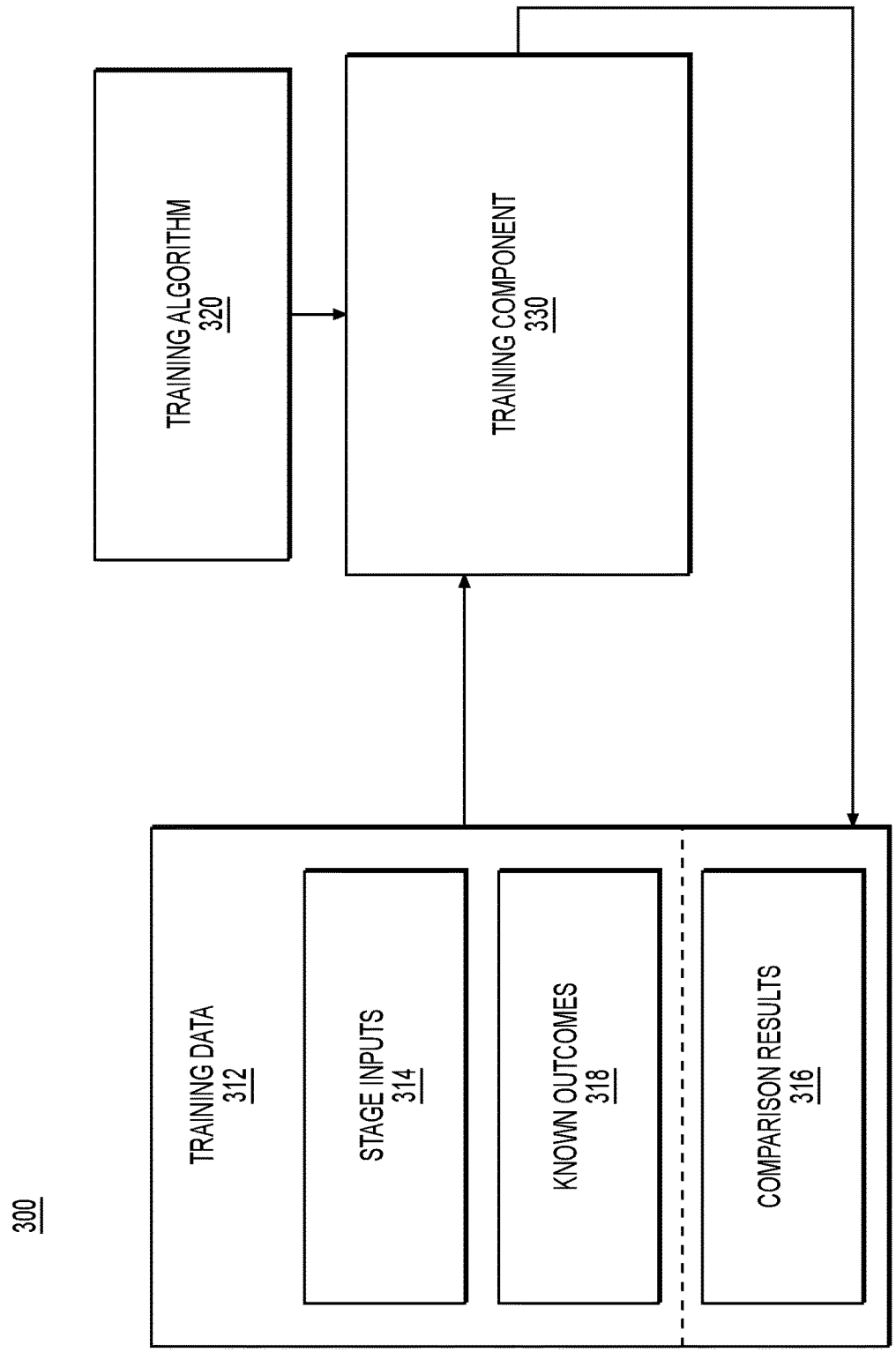
FIG. 3 depicts a data flow for training a machine learning model, according to one or more embodiments.

As disclosed, one or more implementations described herein include a machine learning model. A machine learning model disclosed herein may be trained using the data flow 300 of FIG. 3. As shown in FIG. 3, training data 312 may include one or more of stage inputs 314 and known outcomes 318 related to a machine learning model to be trained. The stage inputs 314 may be from any applicable source including breakpoints, display sizes, document types, container properties, etc. (e.g., one or more outputs from a step from flowchart 200 of FIG. 2). The known outcomes 318 may be included for machine learning models generated based on supervised or semi-supervised training. An unsupervised machine learning model may not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. According to an implementation, the training component 330 may be provided comparison results 316 that compare a previous output of the corresponding machine learning model to apply the previous result to re-train the machine learning model. The comparison results 316 may be used by the training component 330 to update the corresponding machine learning model. The training algorithm 320 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

Figure 4:
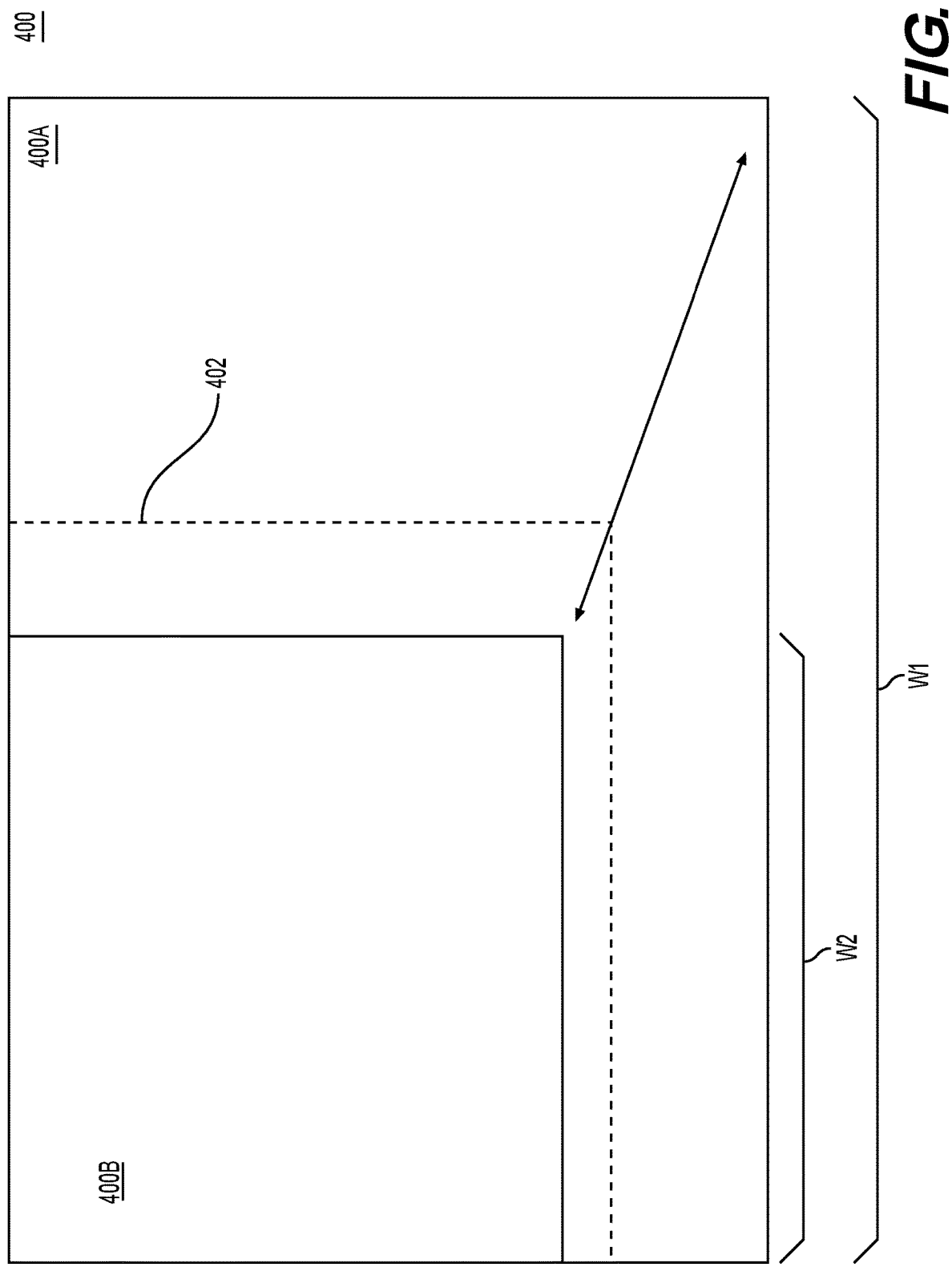
FIG. 4 depicts a diagram for breakpoint determination, according to one or more embodiments.

FIG. 4 depicts a diagram for breakpoint determination, according to an implementation of the disclosed subject matter. As shown, a document 400 may be provided. Document 400 may have a first display size 400A and a second display size 400B. Second display size 400B may be smaller than first display size 400A. Document 400 may switch between first display size 400A and second display size 400B by user input (e.g., resizing via a drag as indicated by the bi-directional arrow in FIG. 4), adjusting an orientation of user device 101, or the like. Alternatively, or in addition, document 400 may be first display size 400A using a first device (e.g., a desktop or laptop computer) and may be second display size 400B using a second device (e.g., a mobile phone).

A breakpoint 402 may be provided by client 102 or may be determined by a machine learning model. The breakpoint 402 may be a pixel based breakpoint or a dimension based breakpoint. For example, the breakpoint may be 768 pixels such that when the dimension of the document cross 768 pixels (e.g., go above, below, or equal 768 pixels), a display indication based action may be taken (e.g., to display or hide a given container). It will be understood that although breakpoint 402 is indicated via a dotted box, the dimensions of the box may be different (e.g., longer, shorter, wider, narrower, etc.) to achieve the same pixel based breakpoint. For example, the box representing breakpoint 402 may correspond to 768 pixels in FIG. 4, and may also correspond to 768 pixels if the box's height is increased but with is decreased, or vice versa.

As another example, the breakpoint may be width based such that the width of the box representing breakpoint 402 may be the breakpoint for document 400. According to this example, the width W1 of first display size 400A may be greater than the breakpoint width of breakpoint 402 and the width W2 of second display size 400B may be less than the breakpoint width of breakpoint 402.

FIG. 5A shows an example display configuration based on first display size 400A. As shown, based on the first display size 400A being greater than the breakpoint 402 of FIG. 4, a first container 502 may be displayed and a second container 504 may be hidden. The first container 502 maybe displayed based on a display indication to display the first container 502 when a display size of a corresponding document is above a breakpoint. The second container 504 maybe hidden based on a display indication to hide the second container 504 when a display size of a corresponding document is above a breakpoint. It will be understood that both the first container 502 and the second container 504 may be provided to document 400 of FIG. 4 and that, in FIG. 5A, a display setting associated with second container 504 may be configured such that second container 504 is hidden.

Additionally, as shown in FIG. 5A, a third container 506 may be provided. The display indication may further indicate that the third container 506 is to be displayed in the configuration shown in FIG. 5A when the first container 502 is displayed and second container 504 is hidden (e.g., when a display size is above a breaking point).

FIG. 5B shows an example display configuration based on second display size 400B. As shown, based on the second display size 400B being less than the breakpoint 402 of FIG. 4, the second container 504 may be displayed and the first container 502 may be hidden. The second container 504 may be displayed based on a display indication to display the second container 504 when a display size of a corresponding document is below a breakpoint. The first container 502 may be hidden based on a display indication to hide the second container 504 when a display size of a corresponding document is below a breakpoint.

Additionally, as shown in FIG. 5B, the third container 506 may be provided. The display indication may further indicate that the third container 506 is to be displayed in the configuration shown in FIG. 5B when the first container 502 is hidden and second container 504 is displayed (i.e., when a display size is below a breaking point).

FIG. 6 depicts a diagram of an author portal 600, according to an implementation of the disclosed subject matter. As shown in FIG. 6, the author portal 600 may include an instruction panel 602 that enables an author to generate display indications via the author portal 600. For example, the author may select one or more of a hide 604, show 606, link 608, and/or set display size 610 buttons, to generate the display indication. According to an implementation, the author may select one of the first container 502, second container 504, or third container 506 from a portion of the author portal 600 and then associate an instruction with the given container. An author may provide a display indication at a first time via author portal 600 and may also provide an updated display indication via author portal 600 at a second time.

An author may use the author portal 600 to provide display indications at any time. For example, the display indication may be provided when programming a document prior to use by a user or may be provided after the document has been populated or otherwise is able to be viewed by a user. As an example, the display indication may be updated and the updated may be pushed to a document via a software update.

According to an implementation a first iteration of a given document may be displayed using a first user device and a second iteration of the given document may be displayed using a second user device. The first iteration may be referred to as a first document and the second iteration may be referred to as a second document. Accordingly, if a user activates the first document on a first device (e.g., a desktop computer), a first container may be hidden and a second container may be displayed. The user may subsequently, or at the same time, open the second document on a second device (e.g., a mobile phone), and the first container may be displayed and the second container may be hidden.

In general, any process or operation discussed in this disclosure that is understood to be computer-implementable, such as the process illustrated in FIG. 2, may be performed by one or more processors of a computer system, such any of the systems or devices in the environment of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

FIG. 7 depicts an example system 700 that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for dynamically displaying database containers, the method comprising:
   receiving a display packet comprising a first container and a second container for display via a document;
   receiving a display indication comprising a first display requirement for the first container and a second display requirement for the second container;
   determining a display size of the document;
   determining a display status based on the display size, the display status corresponding to one of being greater than a breakpoint or being less than or equal to the breakpoint;
   providing the first container and the second container to the document;
   determining, based on the display status and the display indication, to hide the first container and display the second container; and
   displaying the second container while hiding the first container, at a first time, via the document.

2. The method of claim 1, further comprising:
   determining an updated display status based on an updated display size, the updated display status corresponding to the other one of being greater the breakpoint or being less than or equal to the breakpoint;
   determining, based on the display status and the display indication, to hide the second container and display the first container; and
   displaying the first container while hiding the second container, at a second time, via the document.

3. The method of claim 1, wherein the display indication is provided via an author portal.

4. The method of claim 3, wherein the display indication is updated via the author portal to generate an updated display indication.

5. The method of claim 4, further comprising:
   determining, based on the display status and the updated display indication, to hide the second container and display the first container; and
   displaying the first container while hiding the second container, at a second time, via the document.

6. The method of claim 4, further comprising:
   determining, based on the display status and the updated display indication, to display the second container and the first container; and
   displaying the first container and the second container, at a second time, via the document.

7. The method of claim 4, further comprising:
   determining, based on the display status and the updated display indication, to hide the second container and to hide the first container; and
   displaying a third container while hiding the first container and the second container, at a second time, via the document.

8. The method according to claim 1, wherein the first container and the second container are obtained from one of a same database or different databases.

9. The method according to claim 1, wherein the display indication comprises a relationship, the relationship associating the second container to a third container and wherein displaying the second container while hiding the first container further comprises displaying the third container proximate to the second container based on the relationship, via the document.

10. The method of claim 1, further comprising:
    determining a second display size of a second document;
    determining a second display status based on the second display size, the second display status corresponding to one of being greater the breakpoint or being less than or equal to the breakpoint;
    providing the first container and the second container to the second document;
    determining, based on the second display status and the display indication, to hide the second container and display the first container; and
    displaying the first container while hiding the second container via the second document.

11. The method of claim 1, wherein hiding the first container comprises maintaining data associated with the first container at the document without displaying the data associated with the first container in the document.

12. The method of claim 11, wherein maintaining data associated with the first container at the document comprises calling the data associated with the first container in runtime generation of a code associated with the document.

13. A system for dynamically displaying database containers, the system comprising:
    at least one memory storing instructions; and
    at least one processor executing the instructions to perform operations, the operations comprising:
        receiving a display packet comprising a first container and a second container for display via a document;
        receiving a display indication comprising a first display requirement for the first container and a second display requirement for the second container;
        determining a display size of the document;
        determining a display status based on the display size, the display status corresponding to one of being greater a breakpoint or being less than or equal to the breakpoint;
        providing the first container and the second container to the document;
        determining, based on the display status and the display indication, to hide the first container and display the second container; and
        displaying the second container while hiding the first container, at a first time, via the document.

14. The system of claim 13, further comprising:
    determining an updated display status based on an updated display size, the updated display status corresponding to the other one of being greater the breakpoint or being less than or equal to the breakpoint;
    determining, based on the display status and the display indication, to hide the second container and display the first container; and
    displaying the first container while hiding the second container, at a second time, via the document.

15. The system of claim 13, wherein the display indication is provided via an author portal.

16. The system of claim 15, wherein the display indication is updated via the author portal to generate an updated display indication.

17. The system of claim 16, further comprising:
    determining, based on the display status and the updated display indication, to hide the second container and display the first container; and
    displaying the first container while hiding the second container, at a second time, via the document.

18. The system of claim 13, wherein hiding the first container comprises maintaining data associated with the first container at the document without displaying the data associated with the first container in the document.

19. A non-transitory computer-readable medium storing instructions that, when executed by a processor, cause the processor to perform operations, the operations comprising:
    receiving a display packet comprising a first container and a second container for display via a document;
    receiving a display indication comprising a first display requirement for the first container and a second display requirement for the second container;
    determining a display size of the document;
    determining a display status based on the display size, the display status corresponding to one of being greater a breakpoint or being less than or equal to the breakpoint;
    providing the first container and the second container to the document;
    determining, based on the display status and the display indication, to hide the first container and display the second container; and
    displaying the second container while hiding the first container, at a first time, via the document.

20. The non-transitory computer-readable medium of claim 19, wherein the operations further comprise:
    determining an updated display status based on an updated display size, the updated display status corresponding to the other one of being greater the breakpoint or being less than or equal to the breakpoint;
    determining, based on the display status and the display indication, to hide the second container and display the first container; and
    displaying the first container while hiding the second container, at a second time, via the document.

* * * * *